United States Patent
Watanabe (10) Patent No.: US 7,382,411 B2
(45) Date of Patent: Jun. 3, 2008

(54) METHOD FOR FOCUS ADJUSTING AND CAMERA

(75) Inventor: Toshimi Watanabe, Yokohama (JP)

(73) Assignee: Nikon Corporation, Tokyo (JP)

( * ) Notice: Subject to any disclaimer, the term of this patent is extended or adjusted under 35 U.S.C. 154(b) by 754 days.

(21) Appl. No.: 10/638,295

(22) Filed: Aug. 12, 2003

(65) Prior Publication Data

US 2004/0212721 A1    Oct. 28, 2004

(30) Foreign Application Priority Data

Aug. 21, 2002   (JP) ............................. 2002-240324

(51) Int. Cl.
   G03B 13/00    (2006.01)
   H04N 5/232    (2006.01)
(52) U.S. Cl. .................... 348/349; 348/347; 348/356
(58) Field of Classification Search ............... 348/345, 348/354, 240.99–240.3, 356, 349, 353
   See application file for complete search history.

(56) References Cited

U.S. PATENT DOCUMENTS

| 6,876,391 B1 * | 4/2005 | Hashimoto ................ 348/345 |
| 7,098,954 B2 * | 8/2006 | Suda et al. ................ 348/347 |
| 2004/0130648 A1 * | 7/2004 | Kikuchi et al. ............. 348/345 |
| 2005/0083428 A1 * | 4/2005 | Ohkawara ................ 348/345 |
| 2005/0285969 A1 * | 12/2005 | Yasuda ..................... 348/345 |

FOREIGN PATENT DOCUMENTS

| JP | A-2001-343581 | 12/2001 |
| JP | A-2002-072073 | 3/2002 |
| JP | A-2002-311325 | 10/2002 |
| WO | WO 02/10825 | 2/2002 |

* cited by examiner

Primary Examiner—John M. Villecco
Assistant Examiner—Dan Pasiewicz
(74) Attorney, Agent, or Firm—Oliff & Berridge, PLC (57) ABSTRACT

A method for focus adjusting through which a subject image formed with a photographic optical system is captured by an image-capturing device and a focus match position for the photographic optical system is calculated based upon focus evaluation values calculated by using image-capturing signals includes steps for: obtaining focus evaluation values over first sampling increments in a focus adjustment range of the photographic optical system; making a decision as to whether or not a sampling position corresponding to a largest value among the focus evaluation values obtained over the first sampling increments is substantially at an end point of the focus adjustment range; obtaining focus adjustment values over second sampling increments smaller than the first sampling increments in a range that contains the end point and is smaller than the focus adjustment range if the sampling position corresponding to the largest value among the focus evaluation values is at the end point of the focus adjustment range; and calculating the focus match position based upon the focus evaluation values obtained over the second sampling increments.

9 Claims, 9 Drawing Sheets

METHOD FOR FOCUS ADJUSTING AND CAMERA

INCORPORATION BY REFERENCE

The disclosure of the following priority application is herein incorporated by reference: Japanese Patent Application No. 2002-240324 filed Aug. 21, 2002

BACKGROUND OF THE INVENTION

1. Field of the Invention

The present invention relates to a method for focus adjusting and a camera in which focus evaluation values are calculated based upon image-capturing signals output from an image-capturing device and the focus of a photographic lens is adjusted so as to achieve the highest focus evaluation value.

2. Description of the Related Art

In an electronic camera that captures a subject image with an image-capturing element such as a CCD, a focus adjusting method whereby a high-frequency component corresponding to the contrast signals in the image-capturing signals is extracted and the focus lens is moved to a lens position at which the high-frequency component is at the highest level is adopted in the related art. The high-frequency component is referred to as a focus evaluation value and the focus adjusting method described above is referred to as a hill climbing AF.

Normally, the focus lens is caused to move over part of or the entirety of its drive range and the focus evaluation value is obtained at various lens positions in order to calculate the lens position corresponding to the maximum focus evaluation value. As long as a sufficient number of focus evaluation values are obtained relative to the extent of the lens drive range, the highest focus evaluation value is selected and the focus lens is moved to the focus match lens position at which the highest focus evaluation value is obtained.

If, on the other hand, the focus evaluation values cannot be obtained in sufficient numbers, the focus match lens position at which the focus evaluation value is assumed to indicate a substantially highest level is calculated through an interpolation operation (interpolation method) (e.g., a 3-point interpolation operation) or the like. The focus match lens position is calculated through the interpolation operation by using the highest focus evaluation value and at least focus evaluation values at positions preceding and succeeding the position corresponding to the highest focus evaluation value. In this method, the accuracy of the interpolation operation improves as the number of sets of data used in the calculation increases.

However, if the highest focus evaluation value is obtained at a focus evaluation position that is closest to an end point of the lens drive range, the focus evaluation value at the position either preceding or succeeding the focus evaluating position corresponding to the highest focus evaluation value is not available. This gives rise to a problem in that the focus cannot be adjusted with accuracy when the focus match position is present near an end point of the lens drive range.

SUMMARY OF THE INVENTION

The present invention provides a method for focus adjusting and a camera, in which a focus adjustment is executed based upon focus evaluation values, which achieve a highly accurate focus adjustment even when the focus match position is near an end point of the lens drive range.

A method according to the present invention for focus adjusting through which a subject image formed with a photographic optical system is captured by an image-capturing device and a focus match position for the photographic optical system is calculated based upon focus evaluation values calculated by using image-capturing signals, comprises steps for: obtaining focus evaluation values over first sampling increments in a focus adjustment range of the photographic optical system; making a decision as to whether or not a sampling position corresponding to a largest value among the focus evaluation values obtained over the first sampling increments is substantially at an end point of the focus adjustment range; obtaining focus adjustment values over second sampling increments smaller than the first sampling increments in a range that contains the end point and is smaller than the focus adjustment range if the sampling position corresponding to the largest value among the focus evaluation values is at the end point of the focus adjustment range; and calculating the focus match position based upon the focus evaluation values obtained over the second sampling increments.

A camera according to the present invention comprises: an image-capturing device that captures a subject image via a photographic optical system; an evaluation value calculation unit that calculates focus evaluation values based upon image-capturing signals output from the image-capturing device; a moving unit that moves a focus lens of the photographic optical system; and a control unit that controls the evaluation value calculation unit and the moving unit, and: the control unit controls the moving unit so as to move the focus lens from one end point to another end point of a predetermined first range; the control unit controls the evaluation value calculation unit so as to calculate the focus evaluation values over first sampling increments while the focus lens travels from the one end point to the other end point of the first range; the control unit makes a decision as to whether or not a sampling position corresponding to a highest focus evaluation value among the focus evaluation values obtained over the first sampling increments is present substantially at either of two end points of the first range; if the sampling position corresponding to the highest focus evaluation value is determined to be present substantially at either of the two and points, the control unit controls the moving unit so as to move the focus lens from one end point of a second range which contains the sampling position corresponding to the highest focus evaluation value and is smaller than the first range to another end point of the second range; the control unit controls the evaluation value calculation unit so as to calculate the focus evaluation values over second sampling increments set smaller than the first sampling increments while the focus lens moves from the one end point to the other end point of the second range; the control unit calculates a focus match position for the focus lens based upon the focus evaluation values obtained over the second sampling increments; and the control unit controls the moving unit so as to move the focus lens to the calculated focus match position.

In this camera, it is preferred that when the control unit determines that the sampling position corresponding to the highest focus evaluation value among the focus evaluation values obtained over the first sampling increments is not present at either of the two end points of the first range, the control unit calculates the focus match position for the focus lens based upon the focus evaluation values obtained over the first sampling increments.

It is also preferred that: the control unit further makes a decision as to whether or not a sampling position corresponding to a highest focus evaluation value among the focus evaluation values obtained over the second sampling increments is present substantially at either of two end points of the second range; when the sampling position corresponding to the highest focus evaluation value among the focus evaluation values obtained over the second sampling increments is determined to be present at either of the two end points of the second range, the control unit controls the moving unit so as to move the focus lens from one end point of a third range which contains the sampling position corresponding to the highest focus evaluation value among the focus evaluation values obtained over the second sampling increments to another end point of the third range; the control unit controls the evaluation value calculation unit so as to calculate the focus evaluation values over third sampling increments set smaller than the second sampling increments while the focus lens moves from the one end point to the other end point of the third range; and the control unit calculates the focus match position for the focus lens based upon the focus evaluation values obtained over the third sampling increments.

It is also preferred that the control unit calculates the focus match position for the focus lens through interpolation by using the highest focus evaluation value and the focus evaluation values near the highest focus evaluation values that have been obtained.

Another camera according to the present invention comprises: an image-capturing device that captures a subject image via a photographic optical system; an evaluation value calculation unit that calculates focus evaluation values based upon a high-frequency component in image-capturing signals output from the image-capturing device; a moving unit that moves a focus lens of the photographic optical system within a predetermined drive range; a first evaluation value acquisition unit that causes the focus lens to move from one end of the drive range to another end of the drive range along a single direction and obtains a focus evaluation value calculated by the evaluation value calculation unit each time the focus lens travels over a first traveling quantity; a first evaluation value deciding unit that makes a decision as to whether or not a highest focus evaluation value among focus evaluation values obtained by the first evaluation value acquisition unit is present at a point closest to either of two end points of the predetermined drive range; a second evaluation value acquisition unit that causes the focus lens to move from one end of a partial range which contains at least a range extending from the end point near the point corresponding to the highest focus evaluation value to a lens position corresponding to the highest focus evaluation value to another end of the partial range and obtains a focus evaluation value calculated by the evaluation value calculation unit each time the focus lens travels over a second traveling quantity set smaller than the first traveling quantity; and a control unit that moves the focus lens to a focus match lens position calculated based upon a plurality of focus evaluation values obtained by the first evaluation value acquisition unit if the first evaluation value deciding unit determines that the highest focus evaluation value is not the evaluation value which is present at the closest point and moves the focus lens to a focus match lens position calculated based upon a plurality of focus evaluation values obtained by the second evaluation value acquisition unit if the first evaluation value deciding unit determines that the highest focus evaluation value is the evaluation value which is present at the closest point.

In this camera, it is preferred that the first traveling quantity and the second traveling quantity are defined by adjusting a speed at which the focus lens moves.

It is also preferred that the camera further comprises: a second evaluation value deciding unit that makes a decision as to whether or not a highest focus evaluation value among the focus evaluation values obtained by the second evaluation value acquisition unit is the evaluation value which is present at a point closest to the end point contained in the partial range, and if the second evaluation value deciding unit determines that the highest focus evaluation value is present at the point closest to the end point, the control unit moves the focus lens to the end point contained in the partial range.

It is also preferred that the camera further comprises: a second evaluation value deciding unit that makes a decision as to whether or not a highest focus evaluation value among the focus evaluation values obtained by the second evaluation value acquisition unit is the evaluation value which is present at a point closest to the end point contained in the partial range, and a third evaluation value acquisition unit that causes the focus lens to move from the one end to the other end of the partial range along a single direction and obtains a focus evaluation value calculated by the evaluation value calculation unit each time the focus lens travels by a third traveling quantity set smaller than the second traveling quantity while the focus lens moves within the partial range, and if the second evaluation value deciding unit determines that the highest focus evaluation value is present at the point closest to the end point, the control unit moves the focus lens to a focus match lens position calculated based upon a plurality of focus evaluation values obtained by the third evaluation value acquisition unit.

DESCRIPTION OF THE PREFERRED EMBODIMENTS

Figure 1:
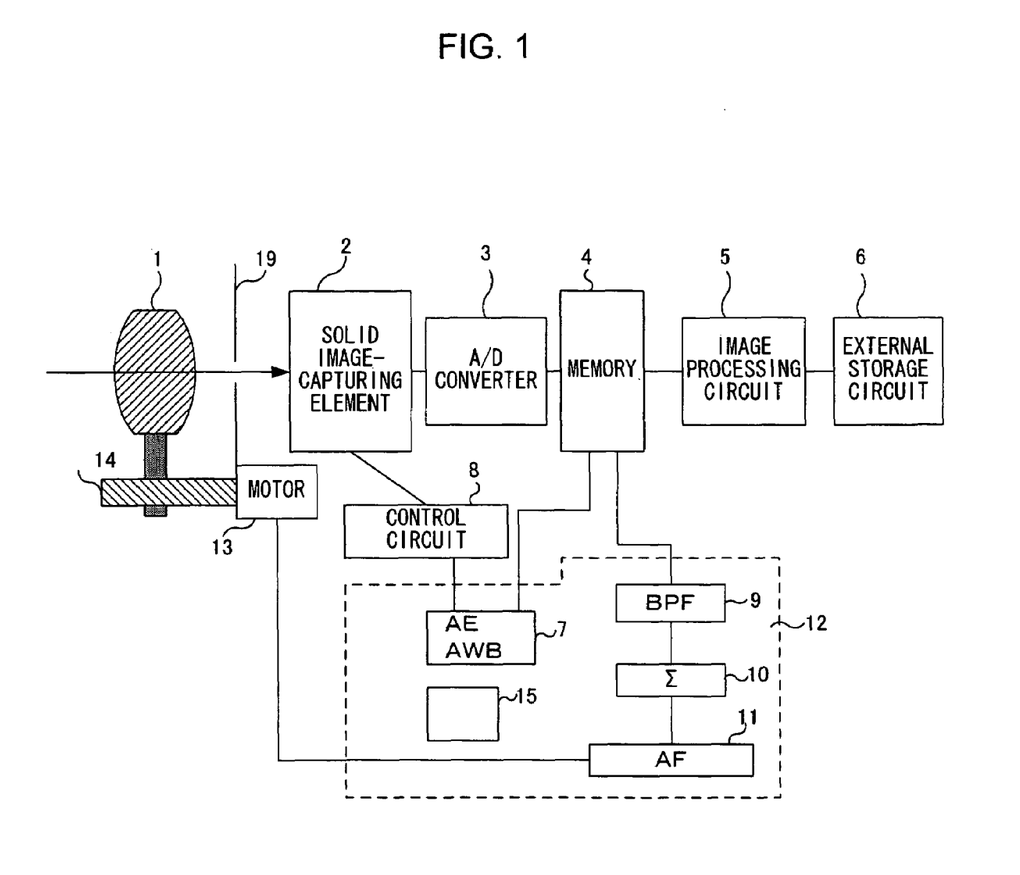
FIG. 1 is a block diagram of an AF (autofocus) digital camera achieved as an embodiment of the camera according to the present invention.

The following is an explanation of an embodiment of the present invention, given in reference to the drawings. FIG. 1 is a block diagram of an AF (autofocus) digital camera achieved as an embodiment of the camera according to the present invention. The digital camera in FIG. 1 comprises a photographic lens 1, a solid image-capturing element 2, an A/D converter 3, a memory 4, an image processing circuit 5, an external storage circuit 6, a control circuit 8, a focus control mechanism 14 that is driven by a motor 13, a CPU 12 and an aperture 19. The CPU 12 includes an AE/AWB processing circuit 7, a band pass filter (BPF) 9, an integrating circuit 10 and an AF circuit 11. The external storage medium 6 is detachably mounted at the digital camera.

The photographic lens 1, which is shown in a simplified form in FIG. 1, is actually constituted with a single lens or a plurality of lenses and performs a focus adjustment by driving a focus lens with the focus control mechanism 14. Namely, the focus lens of the photographic lens 1 is driven by the focus control mechanism 14 along the optical axis so as to adjust the focus of the subject image formed on an image-capturing surface of the solid image-capturing element 2. It is to be noted that the photographic lens 1 may be either a lens with a single focal length (a lens with a fixed focal point) or a lens with a variable focal length such as a zoom lens or a step zoom lens.

The solid image-capturing element 2 is a two-dimensional image-capturing device which may be any of various types of image-capturing devices including a CCD image-capturing device, a MOS image-capturing device and a CID image-capturing device. A CCD image-capturing element is employed in the embodiment. Subject light having passed through the photographic lens 1 travels through an opening at the aperture 19 and forms an image on the image-capturing surface of the solid image-capturing element 2. As the subject image is formed on the image-capturing surface of the solid image-capturing element 2, a signal charge is stored at each pixel in correspondence to the intensity level of the light from the subject image. The length of time over which the electric charge is stored at each pixel (the shutter speed) at the solid image-capturing element 2 is controlled by a shutter gate pulse supplied from the control circuit 8. This function is referred to as an electronic shutter function.

The signal charges stored at the individual pixels at the solid image-capturing element 2 are sequentially read out as image output signals and are converted to digital signals at the A/D converter 3. The image signals having been converted to digital signals are then stored into the memory 4 as image data. The image processing circuit 5 includes signal processing circuits such as a brightness (Y) signal generating circuit, a color difference (C) signal generating circuit and a data compression/decompression circuit. In addition, the image processing circuit 5 reads the image data from the memory 4 and executes various types of signal processing on the image data, then converts the processed image data to image data in a predetermined format (e.g., the JPEG format) and stores the image data into the memory 4 or the external storage circuit 6, which may be a memory card.

The CPU 12, which is connected to the control circuit 8, the memory 4 and the like, executes various types of arithmetic operations to determine the exposure value, the focus state and the like in conformance to specific algorithms, and manages overall control of the AE/AWB processing circuit 7, the AF circuit 11 and the like. AF image data corresponding to the image portion of the subject image which fits inside an AF area are read into the band pass filter 9 from the memory 4. The band pass filter 9 extracts a high-frequency component from the AF image data thus read and the absolute value of the extracted high-frequency component is integrated at the integrating circuit 10. The result of this integration is referred to as a focus evaluation value.

It is to be noted that in the explanation provided above, the focus evaluation value is calculated by the band pass filter 9 and the integrating circuit 10 based upon the image data stored in the memory 4. Instead, the output from the A/D converter 3 may be sequentially provided to the band pass filter 9 so as to allow the focus evaluation value to be calculated simultaneously as the data are transferred. In addition, while the processing assigned to the band pass filter 9 and the integrating circuit 10 in the explanation above is actually executed in software at the CPU 12 in the embodiment, these functions may be realized in hardware instead.

Figure 2:
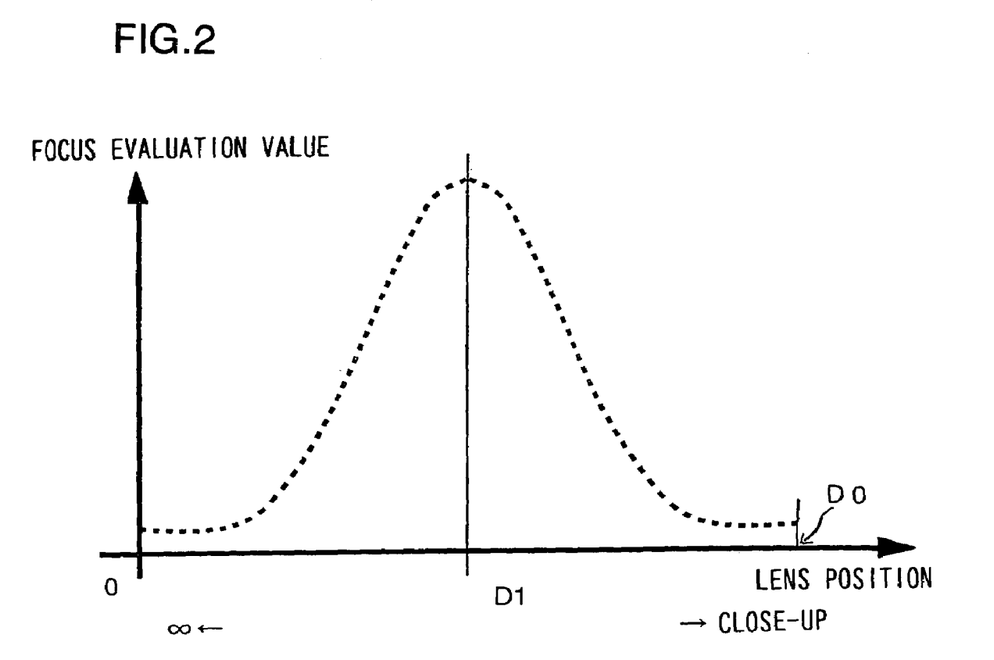
FIG. 2 shows a relationship between the position of the focus lens provided at the photographic lens 1 and the focus evaluation value.

FIG. 2 shows the relationship between the position of the focus lens provided at the photographic lens 1 and the focus evaluation value. In FIG. 2, the position of the focus lens along the optical axis is indicated along the horizontal axis and the focus evaluation value is indicated along the vertical axis. In FIG. 2, the focus evaluation value is the largest at a lens position D1 and, accordingly, a focused subject image is formed on the image-capturing surface of the solid image-capturing element 2 when the focus lens is moved to the lens position D1. In the following explanation the lens position D1 at which the focus evaluation value indicates the highest level is to be referred to as a focus match lens position. The focus lens can be moved over a drive range extending from an infinite side end point (the origin point 0 in the figure) and a close-up side end point (D0).

(Method of Focus Match Lens Position Calculation)

Figure 3:
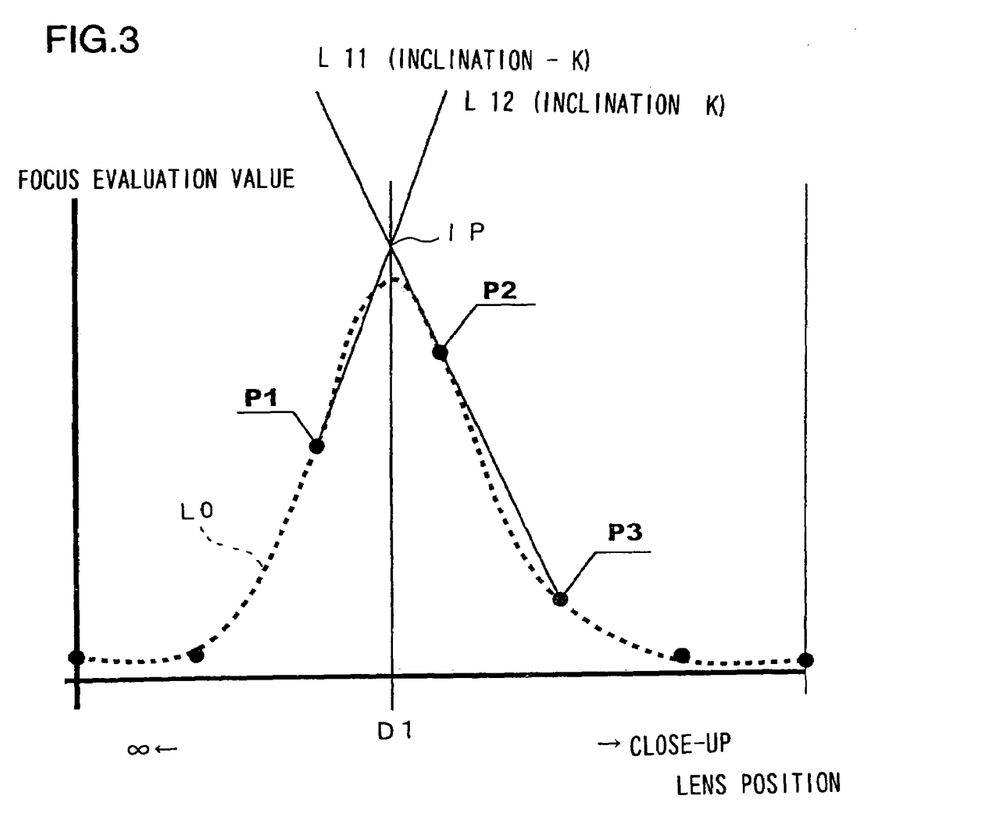
FIG. 3 illustrates a method adopted to calculate the focus match lens position.

FIG. 3 illustrates the method adopted to calculate the focus match lens position through a 3-point interpolation operation (an interpolation method). The filled circles in FIG. 3 each indicate a sampling point at which the focus evaluation value is sampled, and seven focus evaluation values are obtained at seven positions including the two ends of the lens drive range (the infinite side end point and the close-up side end point). A dotted line L0 indicates the profile of the focus evaluation value which peaks at the lens position D1. The lens drive range may be instead referred to as a focus adjustment range, a focus evaluation value acquisition range or a focus evaluation value sampling range.

Of the seven focus evaluation values thus obtained, a focus evaluation value P2 indicates the highest level. In the 3-point interpolation, the focus match lens position (the lens position D1) is calculated by using the highest focus evaluation value P2 and focus evaluation values P1 and P3 obtained at positions preceding and succeeding the position corresponding to the highest focus evaluation value P2. First, of the points P1 and P3, the point P3 with a smaller focus evaluation value is selected and a straight line L11, which passes through the points P2 and P3, is calculated. With −K representing the inclination of the straight line L11, a straight line L12 which has an inclination of K and passes through the point P1 is then calculated. Next, an intersecting point IP of the straight line L11 and the straight line L12 is ascertained. The coordinates of the intersecting point IP are indicated with the lens position and the focus evaluation value, and the lens position corresponding to the intersecting point IP is designated as the focus match lens position D1.

Figure 4:
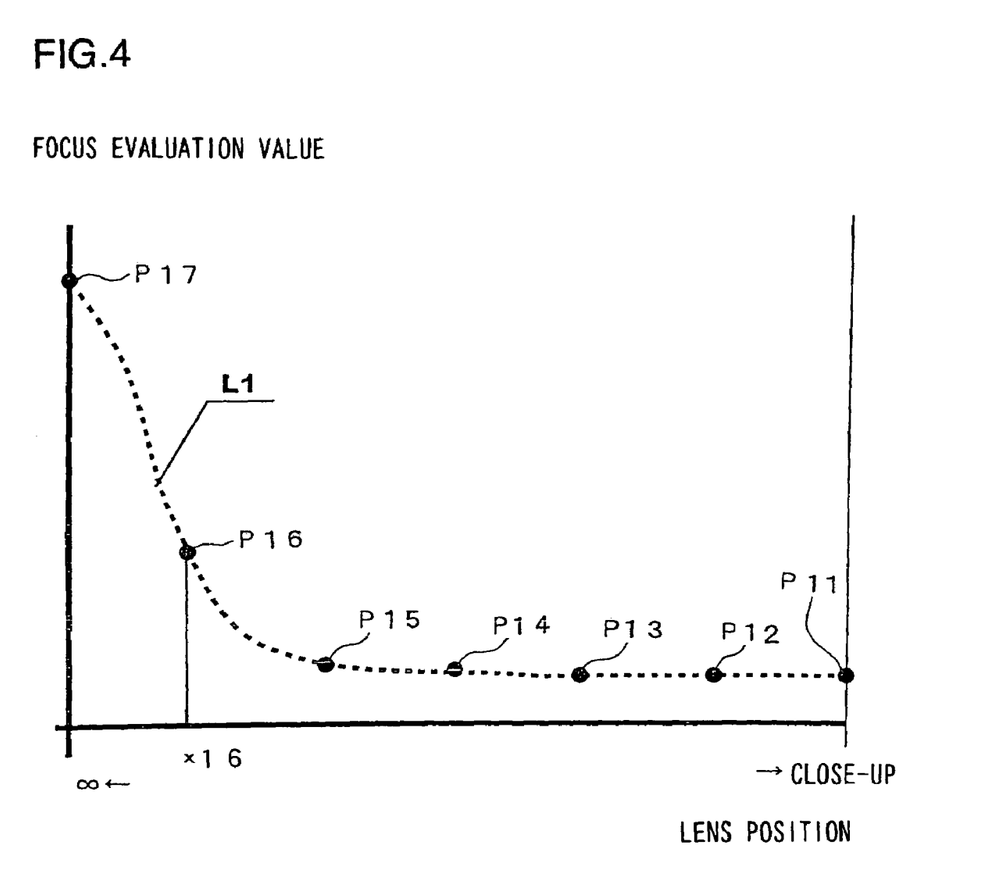
FIG. 4 presents an example of focus evaluation value sampling, showing a focus evaluation value profile L1 extracted when the focus match point is outside the drive range.
Figure 5:
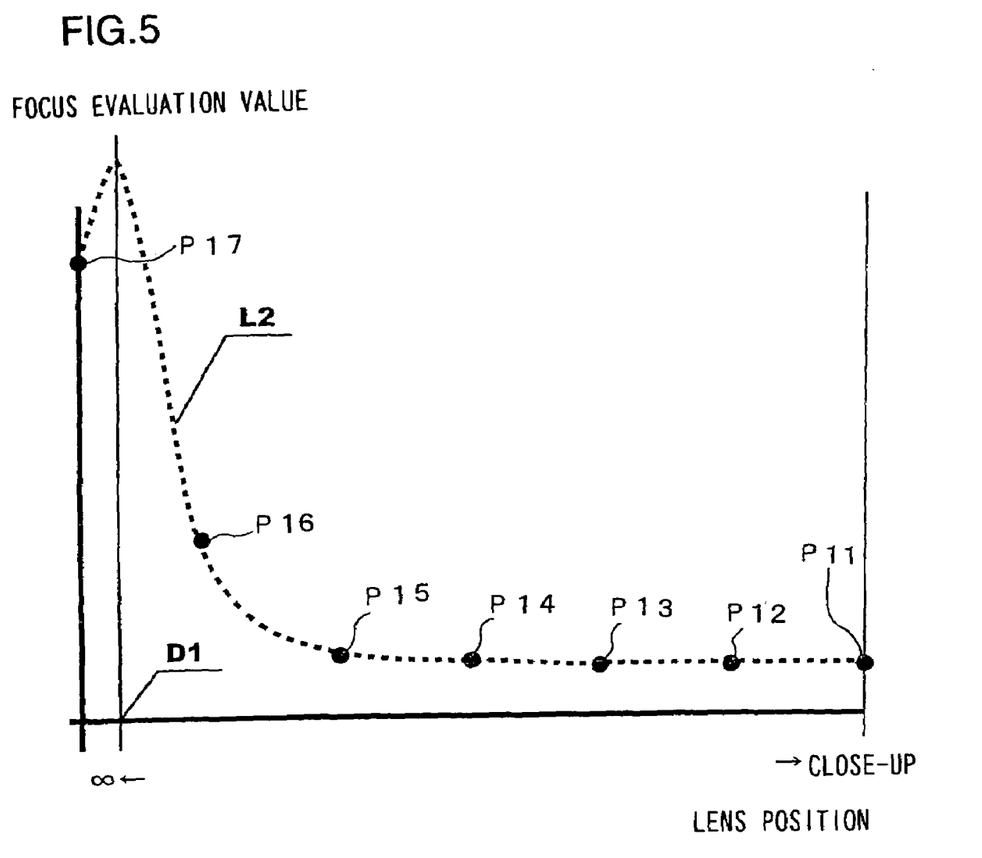
FIG. 5 presents an example of focus evaluation value sampling, showing a focus evaluation value profile L2 extracted when the focus match point is within the drive range.

However, as in focus evaluation values P11 to P17 shown in FIG. 4, if a focus evaluation value P17 at an end point (the infinite side end point) indicates the highest level, the actual focus evaluation value profile may be L2 shown in FIG. 5 instead of a focus evaluation value profile L1 shown in FIG. 4. In the profile L1 in FIG. 4, the focus match lens position is present at a point close to the infinite side end point on the outside, whereas, in the profile L2 in FIG. 5, the focus match lens position D1 is a present at a point close to the infinite side endpoint on the inside. In other words, the focus match lens position may not be calculated with a high degree of accuracy under such circumstances.

(Focus Match Operation)

Figure 6:
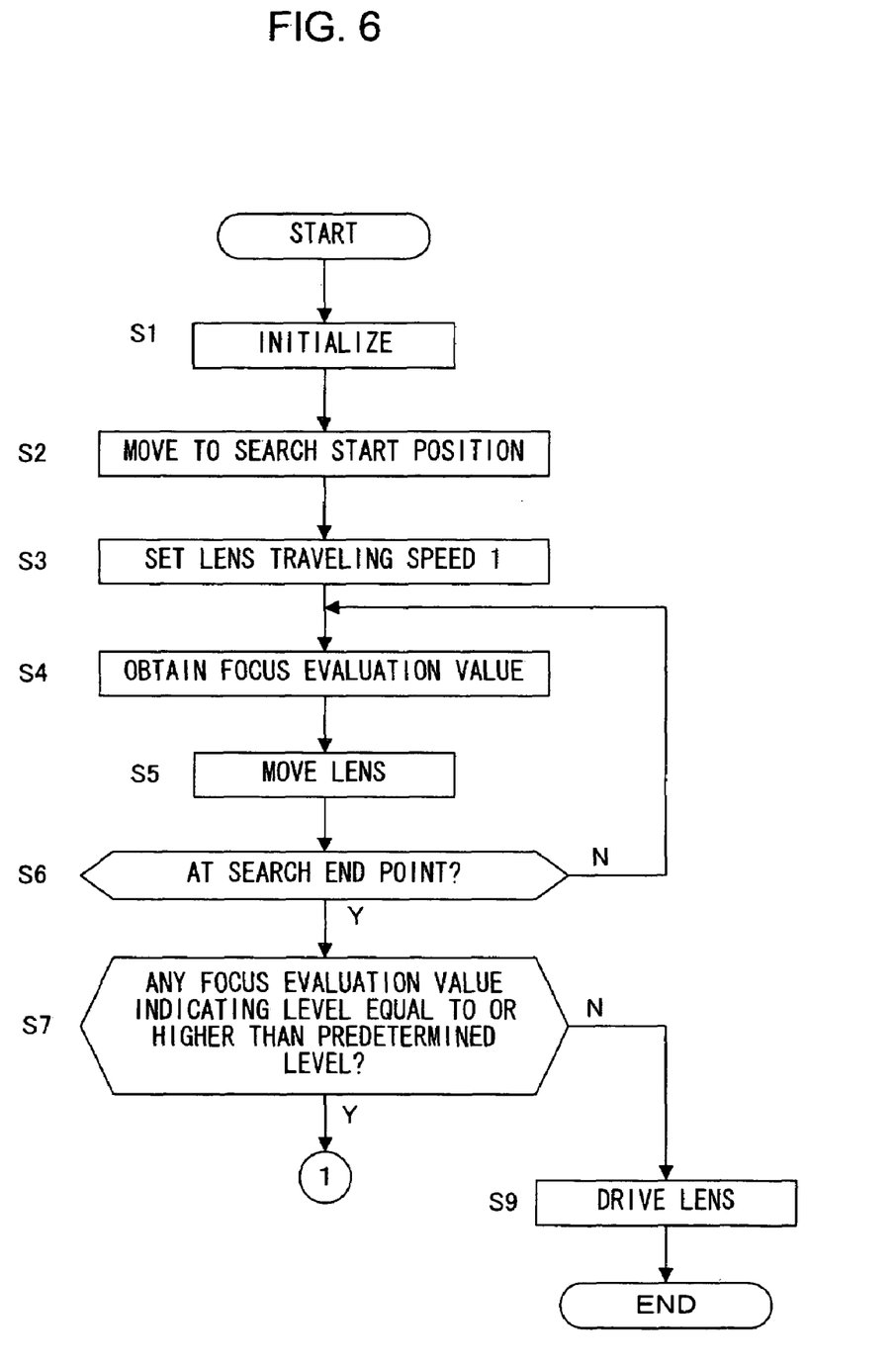
FIG. 6 presents a flowchart of the search operation.
Figure 7:
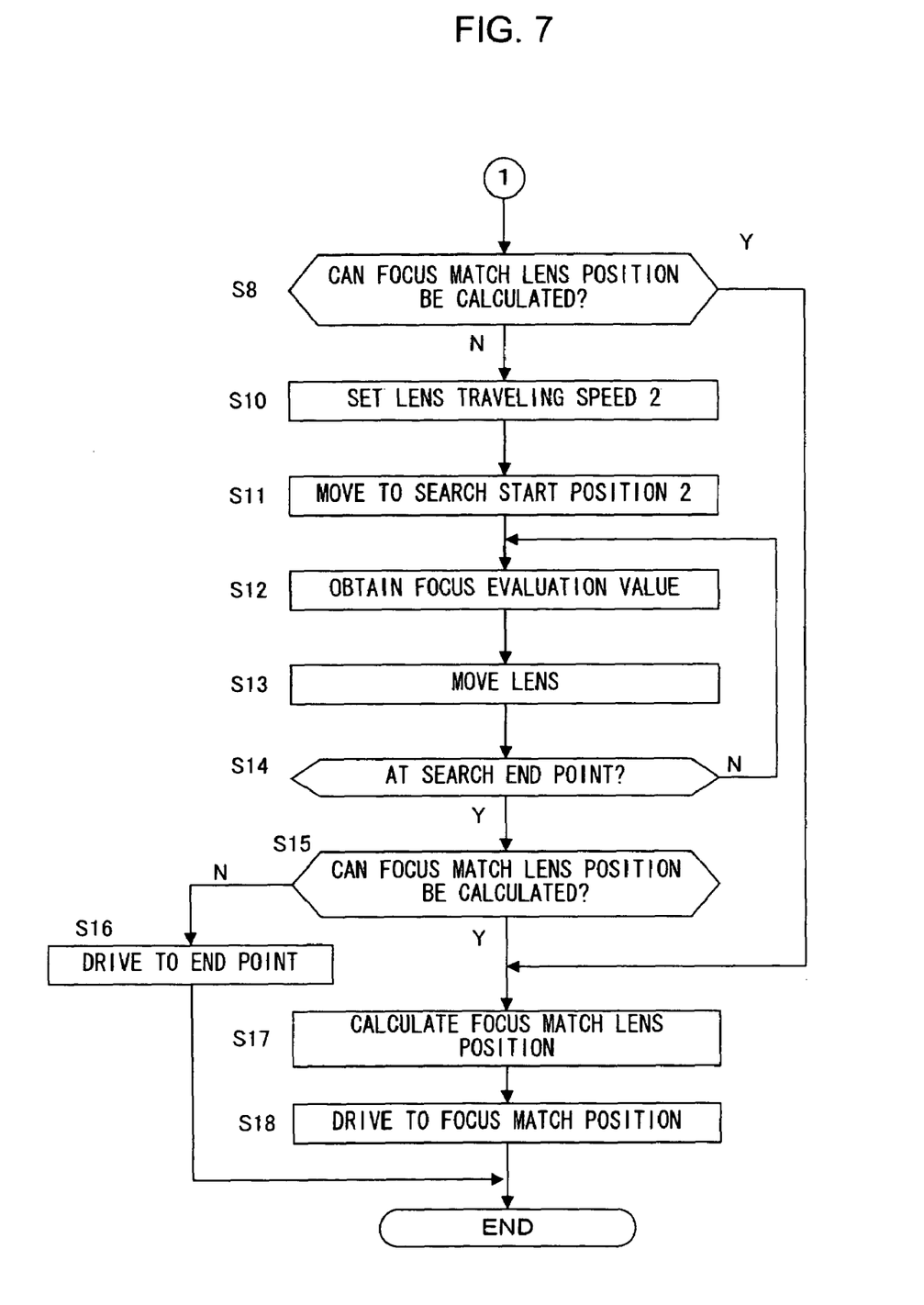
FIG. 7 presents a flowchart of the processing procedure in continuation from the flowchart in FIG. 6.

According to the present invention, the focus match lens position can be calculated accurately even when the focus evaluation value P17 at the end point is the highest focus evaluation value, as shown in FIG. 4. FIGS. 6 and 7 present a flowchart of the focus match operation processing executed in the embodiment. In step S1 in FIG. 6, the data that are necessary for the AF operation, a focus match flag and the like are initialized. In step S2, the focus lens is first moved to a first search start position in order to obtain focus evaluation values over the entire lens drive range (from the infinite side end point to the close-up side end point). The first search start position may be set at the infinite side end point or the close-up side end point. The length of time required to move the focus lens to the first search start position can be reduced by moving the focus lens to the end point closer to the position of the focus lens prior to the search start.

In step S3, the lens traveling speed for the search is set to a first speed V1. The number of focus evaluation values that are sampled changes in correspondence to the level of the lens traveling speed. Since the subject image is captured over predetermined time intervals at the solid image-capturing element 2, the number of sampled focus evaluation values becomes smaller as the lens traveling speed is raised, whereas the number of sampled focus evaluation values becomes larger as the lens traveling speed is lowered. In other words, the lower the lens traveling speed, the smaller the distance over which the lens travels between sampling points so as to sample the focus evaluation values in finer increments, although a lower lens traveling speed also leads to undesirable results of an increase in the length of search time.

Instep S4, a focus evaluation value is calculated. In the first arithmetic operation executed in step S4, to which the operation proceeds from step S3, the focus evaluation value at the first search start position (at the end point) is calculated. In step S5, the focus lens is made to move toward the other end at the first speed V1 set in step S3. In step S6, a decision is made as to whether or not the focus evaluation value search over the entire drive range has been completed, i.e., whether or not the focus lens has reached the other end point on the opposite side from the end point at which the search started and the focus evaluation value at the other end point has been obtained. The operation proceeds to step S7 if it is decided in step S6 that the search has been completed, whereas the operation returns to step S4 if it is decided in step S6 that the search has not yet been completed.

The processing in step S4 to step S6 is repeatedly executed until the focus lens reaches the other end, and focus evaluation values are sampled at a number equal to the number of times the processing is repeatedly executed. The sampled focus evaluation values are stored into a storage unit 15 in FIG. 1. In step S7, a decision is made as to whether or not there is any focus evaluation value among the sampled focus evaluation values indicating a level equal to or higher than a predetermined level. If the contrast of the subject is low, a phenomenon called false focus match may occur, in which the maximum focus evaluation value manifests at a position different from the true focus match position. For this reason, the focus match lens position is calculated only if it is decided in step S7 that there is a focus evaluation value indicating a level equal to or greater than the predetermined level in order to eliminate the risk of such a false focus match in the embodiment.

If it is decided in step S7 that there is no focus evaluation value indicating a level equal to or higher than the predetermined level, the contrast is judged to be too low to enable a focus adjustment, and, accordingly, the operation proceeds to step S9 to move the focus lens to a predetermined specific lens position, e.g., the close-up side end. When the processing in step S9 is completed, the sequence of the focus match operation processing ends. If, on the other hand, it is decided in step S7 that there is a focus evaluation value indicating a level equal to or higher than the predetermined level, the operation proceeds to step S8 in FIG. 7.

In step S8 in FIG. 7, a decision is made as to whether or not the focus match lens position can be calculated through the interpolation operation by using the sampled focus evaluation values. For instance, when the focus match lens position is calculated through the 3-point interpolation method as in the embodiment, the calculation is disabled due to insufficient data if the highest focus evaluation value is at an end point, as shown in FIGS. 4 and 5. Accordingly, the decision in step S8 can be made based upon whether or not the highest focus evaluation value P17 is at the first sampling point or the last sampling point, as shown in FIGS. 4 and 5.

If an affirmative decision is made in step S8, i.e., if the focus match lens position can be calculated by using the sampled focus evaluation values, the operation proceeds to step S17 to calculate the focus match lens position through the 3-point interpolation method. Subsequently, the operation proceeds to step S18 to move the focus lens to the calculated focus match lens position, and then the sequence of the focus match operation ends.

If, on the other hand, a negative decision is made in step S8, the operation proceeds to step S10. In step S10, the lens traveling speed is set to a second speed V2 which is lower than the first speed V1 set in step S3. For instance, V2 may be set to V1/2. In step S11, the focus lens is moved to a second search start position in order to execute a finer search.

For instance, assume a situation in which the focus evaluation values P11 to P17 have been sampled as shown in FIG. 4 by moving the focus lens from the infinite side end point to the close-up side end through the initial focus evaluation value sampling. In this case, while the highest focus evaluation value P17 is present at the infinite side end point, the focus lens is positioned at the close-up side end point at the end of the search. In order to calculate the focus match lens position, it is necessary to obtain focus evaluation values at points between the lens position x16 corresponding to the focus evaluation value P16 and the infinite side endpoint (the coordinate origin point). Thus, at least the range between the lens position x16 and the infinite side endpoint needs to undergo a finer search. Accordingly, in step S11, the lens position x16 is selected as a second search start position and the focus lens is moved from the close-up side end point to the lens position x16.

In step S12, a focus evaluation value is calculated. In the first calculation executed in step S12, to which the operation proceeds from step S11, the focus evaluation value at the second search start position (the lens position x16) is calculated. In step S13, the focus lens is made to move toward the infinite side end point at the second speed V2 set in step S10. In step S14, a decision is made as to whether or not the focus evaluation value search over the entire second search range has been completed, i.e., whether or not the focus lens has reached the infinite side end point and the focus evaluation value at the infinite side end point has been obtained.

The operation proceeds to step S15 if it is decided in step S14 that the search has been completed, whereas the operation returns to step S12 if it is decided in step S14 that the search has not yet been completed.

In step S15, a decision is made as to whether or not the focus match lens position can be calculated through the interpolation operation by using the focus evaluation values sampled through the second search, i.e., whether or not the highest focus evaluation value is present at the end point. If it is decided in step S15 that the highest focus evaluation value is present at the end point and thus the focus match lens position cannot be calculated, the operation proceeds to step S16 to move the focus lens to the end point at which the focus evaluation value indicates the highest level. For instance, if the state illustrated in FIG. 4 is indicated, the focus lens is made to move to the infinite side end point.

If, on the other hand, it is decided in step S15 that the highest focus evaluation value is not present at the end point and thus the focus match lens position can be calculated, the operation proceeds to step S17. In step S17, the focus match lens position is calculated based upon the focus evaluation values sampled through the second search. Then, in step S18, the focus lens is made to move to the focus match lens position calculated in step S17. When the processing in step S18 is completed, the sequence of the focus match operation ends.

Figure 8:
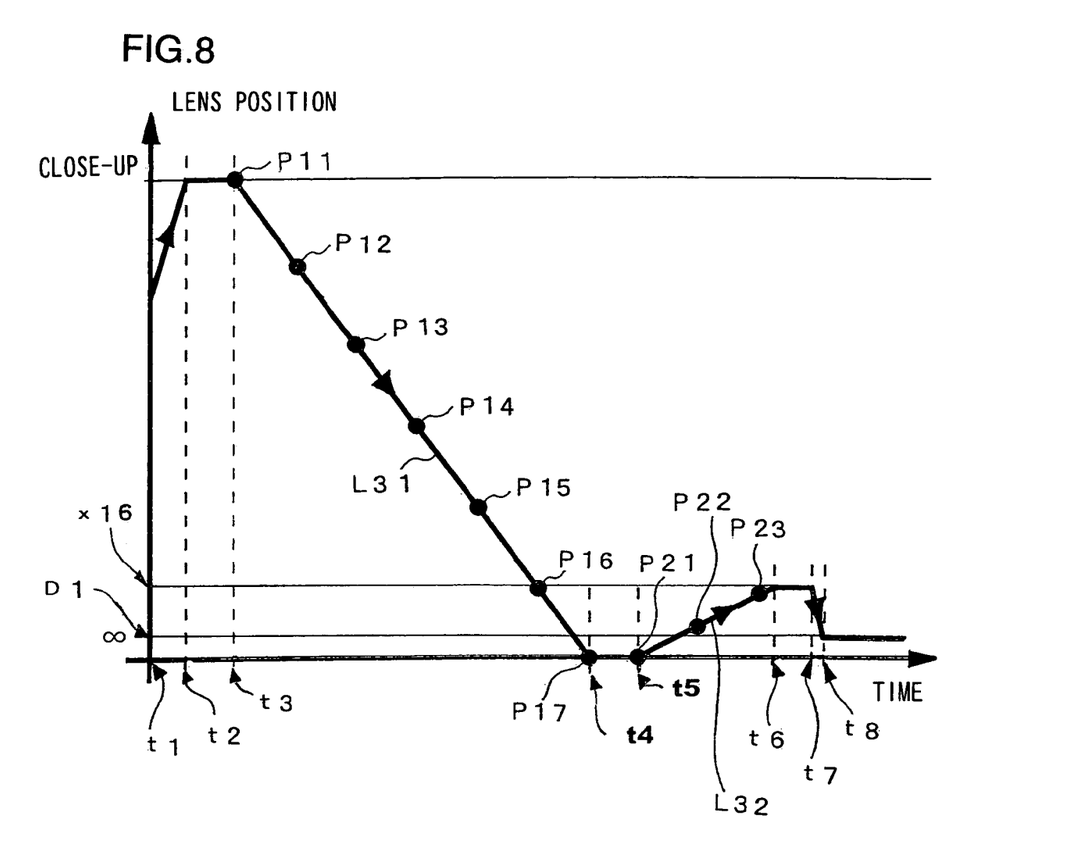
FIG. 8 shows a change that occurs over time with regard to the focus lens position in a focus match operation.

FIG. 8 shows the change that occurs over time with regard to the focus lens position during the focus match operation, with the lens position indicated along the vertical axis and the time point indicated along the horizontal axis. The polygonal lines in FIG. 8 indicate the focus lens positions at varying time points. A straight line segment L31 constituted of polygonal lines represents the first search, whereas a straight line segment L32 represents the second search. Filled circles P11 to P17 and P21 to P23 on the straight line segments L31 and L32 indicate sampling points set over uniform time intervals.

At a time point t1, the focus lens starts to be driven toward the close-up side end point which is designated as the search start position (step S2). The focus lens reaches the close-up side end point at that time point t2. The first search starts at a time point t3 (step S4), and the focus lens is caused to move from the close-up side end point toward the infinite side end point at the first speed V1 to reach the infinite side endpoint at a time point t4 (step S6). Through this search, the focus evaluation values are obtained at the seven sampling points P11 to P17. FIG. 4 described earlier shows varying levels indicated by the focus evaluation values taken at the sampling points P11 to P17 with the focus evaluation value at the sampling point P17 indicating the highest level.

In the example presented in FIG. 8, the focus lens is positioned at the infinite side endpoint when the first search is completed. Thus, the infinite side endpoint is designated as the search start position for the second search and the focus lens is made to move to the lens position x16 corresponding to the sampling point P16. The second search is started at a time point t5 and is completed at a time point t6. Since the traveling speed V2 for the second search is set lower than the traveling speed V1 for the first search, the inclination of the straight line segment L32 is smaller than the inclination of the straight line segment L31, and the distance over which the focus lens travels between sampling points is smaller than the distance over which the focus lens travels between the sampling points on the straight line segment L31. Thus, focus evaluation values are obtained at three sampling points P21 to P23 through the second search.

Among the focus evaluation values obtained through the second search, the focus evaluation value at the sampling point P22 which is the closest to the focus match lens position indicates the highest level. Accordingly, the focus match lens position D1 is calculated through the 3-point interpolation operation by using the focus evaluation values taken at the sampling points P21 to P23. When the calculation is completed, the focus lens starts to travel to the focus match lens position D1 at a time point t7 and its movement stops when it reaches the focus match lens position D1 at a time point t8.

(Example of Variation)

While the focus lens is made to move to the end point at which the highest focus evaluation value has been obtained if the focus match lens position cannot be calculated after the second search in the embodiment described above, a third search may instead be executed with the lens traveling speed set even lower. In such a case, the operation should be executed as shown in the flowchart presented in FIG. 9 instead of the flowchart presented in FIG. 7. It is to be noted that the same step numbers are assigned to steps in the flowchart in FIG. 9 in which processing identical to that in FIG. 7 is executed.

Figure 9:
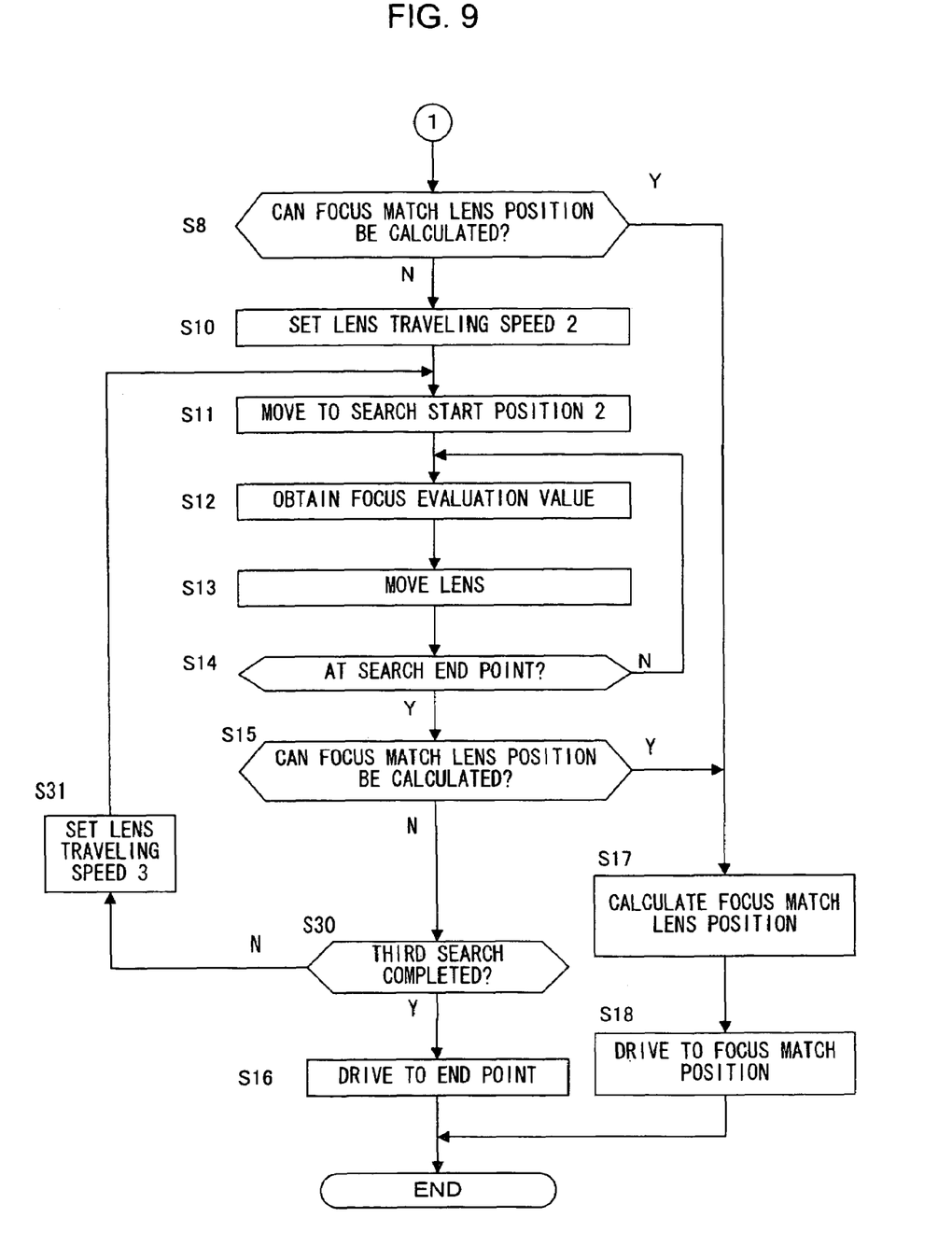
FIG. 9 presents a flowchart of a variation.

The processing executed in steps S10 to S14 in FIG. 9 relates to the second search and is identical to that shown in FIG. 7. When the second search is completed, the operation proceeds to step S15 to make a decision as to whether or not the focus match lens position can be calculated by using the focus evaluation values sampled in the second search. If it is decided in step S15 that the focus match lens position can be calculated, the focus match lens position is calculated in step S17 as in the processing shown in FIG. 7 and then the focus lens is made to move to the calculated focus match lens position in step S18.

If, on the other hand, it is decided in step S15 that the focus match lens position cannot be calculated, the operation proceeds to step S30 to make a decision as to whether or not a third search has been completed. If it is decided in step S30 that the third search has been completed, the operation proceeds to step S16 to move the focus lens to the end point at which the highest focus evaluation value has been sampled and the sequence of the focus match operation ends. If, on the other hand, it is decided in step S30 that the third search has not been completed, the operation proceeds to step S31 to set the lens traveling speed to a third speed V3 which is lower than the second speed V2.

Once the traveling speed is set in step S31, the operation proceeds to step S11. In step S11, the focus lens is moved to the second search start position (the infinite side end point in FIG. 8) in order to execute the third search. In this example, the focus lens is moved to the second search start position so as to search the same lens drive range in the third search as that searched through the second search. However, since the focus lens is set at the lens position x16 when the second search is completed in the example shown in FIG. 8, the position x16 instead may be designated as the search start position for the third search.

Alternatively, since the focus evaluation value peak is assumed to be present between the sampling points P21 and P22, the search start position may be set to the lens position corresponding to the sampling point P22. Subsequently, when the third search is completed by repeatedly executing the processing in step S12 through step S14, the processing in step S15 and subsequent steps is executed in a manner similar to that with which the processing is executed following the completion of the second search.

As described above, a finer second search with shorter sampling increments is executed if the focus match lens position cannot be calculated after the first search and, as a result, a highly accurate focus adjustment can be achieved even when the focus match lens position is present in the vicinity of an endpoint of the lens drive range in the embodiment. In particular, since the third search as well as the second search is executed, the focus match lens position can be calculated with a higher degree of reliability in the variation.

In addition, in cameras in the related art in which the focus match lens position is calculated through a single search, the search must be executed with small sampling increments over the entire drive range in order to ensure that even a focus match position present near an end point is detected accurately. For this reason, the length of time required for the focus adjustment is significant. However, in the embodiment, the first search is executed over the entire range at high speed with large sampling increments and then finer sampling is conducted over a smaller range near the end point during the second and third searches. In this case, the focus match lens position can be calculated after a single search if the focus evaluation value peak is a present at a point that is not in the vicinity of an end point, and the second and third searches are executed only if the peak is present near an end point. As a result, a highly accurate focus adjustment is achieved and, at the same time, the focus adjustment operation can be executed at high speed.

While the present invention is adopted in a digital camera in the embodiment described above, it may be adopted in any camera as long as the camera captures a subject image with an image-capturing element and executes focus adjustment by using focus evaluation values calculated based upon image-capturing signals.

When describing the embodiment, the solid image-capturing element 2 may be referred to as an image-capturing device, the band pass filter 9 and the integrating circuit 10 together may be referred to as an evaluation value calculation unit, the motor 13 and the focus control mechanism 14 together may be referred to as a moving unit and the CPU 12 may be referred to as first, second and third evaluation value acquisition units, first and second evaluation value deciding units and a control unit.

The above described embodiment is an example and various modifications can be made without departing from the spirit and scope of the invention.

What is claimed is:

1. A method for focus adjusting through which a subject image formed with a photographic optical system is captured by an image-capturing device and a focus match position for the photographic optical system is calculated based upon focus evaluation values calculated by using image-capturing signals, comprising:

obtaining focus evaluation values over first sampling increments in a focus adjustment range of the photographic optical system;

making a decision as to whether or not a sampling position corresponding to a largest value among the focus evaluation values obtained over the first sampling increments is substantially at an end point of the focus adjustment range;

obtaining focus adjustment values over second sampling increments smaller than the first sampling increments in a range that contains the end point and is smaller than the focus adjustment range if the sampling position corresponding to the largest value among the focus evaluation values is substantially at the end point of the focus adjustment range; and calculating the focus match position based upon the focus evaluation values obtained over the second sampling increments.

2. A camera comprising:

an image-capturing device that captures a subject image via a photographic optical system;

an evaluation value calculation unit that calculates focus evaluation values based upon image-capturing signals output from the image-capturing device;

a moving unit that moves a focus lens of the photographic optical system; and a control unit that controls the evaluation value calculation unit and the moving unit, wherein:

the control unit controls the moving unit so as to move the focus lens from one end point to another end point of a predetermined first range;

the control unit controls the evaluation value calculation unit so as to calculate the focus evaluation values over first sampling increments while the focus lens travels from the one end point to the other end point of the first range;

the control unit makes a decision as to whether or not a sampling position corresponding to a highest focus evaluation value among the focus evaluation values obtained over the first sampling increments is present substantially at either of two end points of the first range;

if the sampling position corresponding to the highest focus evaluation value is determined to be present substantially at either of the two end points, the control unit controls the moving unit so as to move the focus lens from one end point of a second range which contains the sampling position corresponding to the highest focus evaluation value and is smaller than the first range to another end point of the second range;

the control unit controls the evaluation value calculation unit so as to calculate the focus evaluation values over second sampling increments set smaller than the first sampling increments while the focus lens moves from the one end point to the other end point of the second range;

the control unit calculates a focus match position for the focus lens based upon the focus evaluation values obtained over the second sampling increments; and the control unit controls the moving unit so as to move the focus lens to the calculated focus match position.

3. A camera according to claim 2, wherein:

when the control unit determines that the sampling position corresponding to the highest focus evaluation value among the focus evaluation values obtained over the first sampling increments is not present substantially at either of the two end points of the first range, the control unit calculates the focus match position for the focus lens based upon the focus evaluation values obtained over the first sampling increments.

4. A camera according to claim 2, wherein:

the control unit further makes a decision as to whether or not a sampling position corresponding to a highest focus evaluation value among the focus evaluation values obtained over the second sampling increments is present substantially at either of two end points of the second range;

when the sampling position corresponding to the highest focus evaluation value among the focus evaluation values obtained over the second sampling increments is determined to be present substantially at either of the two end points of the second range, the control unit controls the moving unit so as to move the focus lens from one end point of a third range which contains the sampling position corresponding to the highest focus evaluation value among the focus evaluation values obtained over the second sampling increments to another end point of the third range;

the control unit controls the evaluation value calculation unit so as to calculate the focus evaluation values over third sampling increments set smaller than the second sampling increments while the focus lens moves from the one end point to the other end point of the third range; and the control unit calculates the focus match position for the focus lens based upon the focus evaluation values obtained over the third sampling increments.

5. A camera according to claim 2, wherein:

the control unit calculates the focus match position for the focus lens through interpolation by using the highest focus evaluation value and the focus evaluation values near the highest focus evaluation values that have been obtained.

6. A camera comprising:

an image-capturing device that captures a subject image via a photographic optical system;

an evaluation value calculation unit that calculates focus evaluation values based upon a high-frequency component in image-capturing signals output from the image-capturing device;

a moving unit that moves a focus lens of the photographic optical system within a predetermined drive range;

a first evaluation value acquisition unit that causes the focus lens to move from one end of the drive range to another end of the drive range along a single direction and obtains a focus evaluation value calculated by the evaluation value calculation unit each time the focus lens travels over a first traveling quantity;

a first evaluation value deciding unit that makes a decision as to whether or not a highest focus evaluation value among focus evaluation values obtained by the first evaluation value acquisition unit is present at a point closest to either of two end points of the predetermined drive range;

a second evaluation value acquisition unit that causes the focus lens to move from one end of a partial range which contains at least a range extending from the end point near the point corresponding to the highest focus evaluation value to a lens position corresponding to the highest focus evaluation value to another end of the partial range and obtains a focus evaluation value calculated by the evaluation value calculation unit each time the focus lens travels over a second traveling quantity set smaller than the first traveling quantity; and a control unit that moves the focus lens to a focus match lens position calculated based upon a plurality of focus evaluation values obtained by the first evaluation value acquisition unit if the first evaluation value deciding unit determines that the highest focus evaluation value is not the evaluation value which is present at the closest point and moves the focus lens to a focus match lens position calculated based upon a plurality of focus evaluation values obtained by the second evaluation value acquisition unit if the first evaluation value deciding unit determines that the highest focus evaluation value is the evaluation value which is present at the closest point.

7. A camera according to claim 6, wherein:

the first traveling quantity and the second traveling quantity are defined by adjusting a speed at which the focus lens moves.

8. A camera according to claim 6, further comprising:

a second evaluation value deciding unit that makes a decision as to whether or not a highest focus evaluation value among the focus evaluation values obtained by the second evaluation value acquisition unit is the evaluation value which is present at a point closest to the end point contained in the partial range, wherein:

if the second evaluation value deciding unit determines that the highest focus evaluation value is present at the point closest to the end point, the control unit moves the focus lens to the end point contained in the partial range.

9. A camera according to claim 6, further comprising:

a second evaluation value deciding unit that makes a decision as to whether or not a highest focus evaluation value among the focus evaluation values obtained by the second evaluation value acquisition unit is the evaluation value which is present at a point closest to the end point contained in the partial range, and a third evaluation value acquisition unit that causes the focus lens to move from the one end to the other end of the partial range along a single direction and obtains a focus evaluation value calculated by the evaluation value calculation unit each time the focus lens travels by a third traveling quantity set smaller than the second traveling quantity while the focus lens moves within the partial range, wherein:

if the second evaluation value deciding unit determines that the highest focus evaluation value is present at the point closest to the end point, the control unit moves the focus lens to a focus match lens position calculated based upon a plurality of focus evaluation values obtained by the third evaluation value acquisition unit.

* * * * *